United States Patent [19]
Bailey et al.

[11] 4,025,489
[45] May 24, 1977

[54] UTILIZATION OF BISPHENOL-A FROM THE ALKALINE PHASE GENERATED IN THE PRODUCTION OF POLYCARBONATES

[75] Inventors: John V. Bailey; Thomas H. Cleveland, both of New Martinsville, W. Va.; Emanuel W. Wirfel, Coraopolis, Pa.

[73] Assignee: Mobay Chemical Corporation, Pittsburgh, Pa.

[22] Filed: Jan. 27, 1975

[21] Appl. No.: 544,246

[52] U.S. Cl. .......................... 260/47 XA; 260/463
[51] Int. Cl.² .................. C07C 68/02; C07C 69/96; C08G 63/62
[58] Field of Search ...................... 260/47 XA, 463

[56] References Cited
UNITED STATES PATENTS

| | | |
|---|---|---|
| 3,028,365 | 4/1962 | Schnell et al. ................. 260/47 XA |
| 3,046,255 | 7/1962 | Strain et al. ................... 260/47 XA |
| 3,437,639 | 4/1969 | Beach et al. .................. 260/47 XA |
| 3,646,102 | 2/1972 | Kobayashi et al. ........... 260/47 XA |
| 3,787,359 | 1/1974 | Horn et al. .................... 260/47 XA |

*Primary Examiner*—Allan Lieberman
*Attorney, Agent, or Firm*—Gene Harsh; Lawrence S. Pope

[57] ABSTRACT

This invention relates to polycarbonates and more particularly to recovering unreacted bisphenol-A from the alkaline phase generated in the production of polycarbonates, comprising reacting the alkaline phase with phosgene to convert the unreacted bisphenol-A to a low molecular weight polymer and returning a solvent solution of the low molecular weight polymer to the main reaction stream.

17 Claims, 2 Drawing Figures

EFFECT OF COCl$_2$/BPA MOLAR RATIO ON BPA REMOVAL FROM AQUEOUS ALKALINE LAYER

UTILIZATION OF BISPHENOL-A FROM THE ALKALINE PHASE GENERATED IN THE PRODUCTION OF POLYCARBONATES

BACKGROUND OF THE INVENTION

Polycarbonate resins and methods for the preparation thereof are well-known to the art. Generally speaking, polycarbonate resins are conventionally prepared by reacting an acid chloride of a carbonic acid with a diphenylolalkane in a heterogeneous liquid reaction medium comprising an aqueous alkaline solution containing a reaction catalyst and an inert organic solvent.

More specifically, the polycarbonate resin preferably comprises the reaction product of carbonyl chloride, i.e., phosgene, and 2,2-(4,4'-dihydroxydiphenyl)-propane, more commonly referred to as bisphenol-A, hereafter BPA, in a molar ratio of between about 1.1 to about 1.2 mols of phosgene per mol of BPA.

It is, of course, to be understood that other diphenylolalkanes may also be used, such as, for example: (4,4'-dihydroxydiphenyl)-methane; 1,1-(4,4'-dihydroxy-diphenyl)-cyclohexane; 1,1-(4,4'-dihydroxy-3,3'-dimethyl-diphenyl)-cyclohexane; 2,2-(2,2'dihydroxy-4,4'-di-tert-butyl-diphenyl)-propane; 1,1-(2,2'-dihydroxy-4,4'-dimethyl-diphenyl)-butane; 3,4-(4,4'-dihydroxy-diphenyl)-hexane; 1,1-(4,4'-dihydroxy-diphenyl)-1-phenyl-ethane; 2,2'-(4,4'-dihydroxy-diphenyl)-butane; 2,2-(4,4'-dihydroxy-diphenyl)-pentane; 3,3'-(4,4'-dihydroxy-diphenyl)-pentane; 2,2-(4,4'-dihydroxy-diphenyl)-3-methyl-butane; 2,2'-(4,4'-dihydroxydiphenyl)-hexane; 2,2'-(4,4'-dihydroxy-diphenyl)-4-methylpentane; 2,2-(4,4'-dihydroxy-diphenyl)-heptane; 4,4-(4,4'-dihydroxy-diphenyl)-heptane; 2,2-(4,4'-dihydroxy-diphenyl)-tridecane; and the like, which compounds are produced in known manner by condensing phenols with aldehydes or ketones. It will also be understood that mixtures of the foregoing exemplary compounds may also be used.

The aqueous alkaline phase of the heterogeneous medium generally comprises aqueous solutions of water soluble alkaline materials or aqueous dispersions of water insoluble alkaline materials. Most preferred are inorganic alkaline materials which function as hydrogen halide acceptors. Exemplary of such materials are the oxides, hydroxides and carbonates of alkaline earth metals and alkali metals, such as, sodium, potassium, calcium, barium, strontium, magnesium and the like. Preferably, a concentrated aqueous solution of sodium hydroxide is used having a sodium hydroxide content of from about 40 to about 60 percent by weight. Generally, about one mol of sodium hydroxide is used per mol of phosgene.

The inert organic solvent is one in which the polycarbonate resin is soluble, sufficient solvent being used to produce about a 14 percent by weight solution of polycarbonate in the solvent. Typical of such solvents are methylene chloride, ethylene chloride; benzene; monochlorobenzene; methyl cyclohexane; cyclohexane; toluene; xylene; chloroform; carbon tetrachloride; trichloroethylene; perchloroethylene; and the like, as well as mixtures thereof.

It is advantageous to catalyze the reaction of phosgene and BPA by adding a catalytic amount of tertiary or quaternary organic base or salt to the reaction mixture. Some specific examples of such catalysts are trimethylamine; triethylamine; dimethylaniline; diethylaniline; dimethylcyclohexylamine; pyridine and the like, as well as the corresponding hydrochlorides. Further examples of suitable catalysts are tetramethylammonium hydroxide; triethyloctadecylammonium chloride; trimethylbenzylammonium fluoride; triethyl-benzylammonium chloride; dimethyldodecylammonium chloride; dimethylbenzylphenylammonium chloride; trimethylcyclohexylammonium bromide; N-methyl pyridinium chloride; N-methyl morpholine; and the like. A preferred catalyst is triethylamine and is used in amounts ranging from 0.1 to about 0.3 percent by weight based on the weight of polycarbonate and is preferably added after the initial reaction between the BPA and phosgene and prior to phase separation.

The reaction between the BPA and phosgene occurs at the phase boundary or interface of the solvent/aqueous phases, the organic solvent retaining the polycarbonate resin thus formed in solution. At the completion of polymer formation, the reaction medium is separated into two immiscible phases. The organic solvent phase containing the dissolved resin is further processed by conventional means such as, for example, distillation, non-solvent addition or the like to recover the resin and the aqueous alkaline phase is discharged to waste.

However, both federal and state pollution control regulations prohibit the discharge of the aqueous alkaline phase without some type of treatment to neutralize the high caustic content and to reduce the level of organic components. The major source of organic components in the alkaline layer results from the presence of excess, unreacted BPA. As is well-known, an excess of BPA is required to assure that all of the chlorocarbonate end group products of the reaction of phosgene with the sodium salt of BPA are completely reacted. If the polycarbonate resin contains unreacted chlorocarbonate end groups, during extrusion or molding of the resin, these groups tend to break down and produce acidic materials, i.e., hydrogen chloride, resulting in corrosive damage to the extrusion and molding apparatus.

The amount of BPA in the aqueous alkaline phase can vary between about 0.01 to about 0.7 percent by weight and is usually between about 0.1 and about 0.3 percent by weight with an average BPA content of about 0.25 percent by weight. It would be desirable if this BPA could be recovered and used in the production of additional polycarbonate, for in a full-scale operation, the amount of BPA contained in the alkaline layer is significant. For example, in a plant having a polycarbonate production capacity of about 60 million pounds per year, the excess BPA in the alkaline layer averages about 113 pounds per hour. Thus the recovery and utilization of this unreacted, excess BPA results in a two-fold advantage in that significant savings in the cost of starting materials will be realized and the organic materials content of the alkaline waste will be significantly reduced.

It has been proposed in, for example, U.S. Pat. No. 3,240,755 to recover excess BPA from the aqueous alkaline phase by neutralizing the same with acids such as, for example, hydrochloric acid, sulfuric acid or the like. Upon neutralization, the BPA precipitates from the aqueous phase and is recovered by filtration. However, this means of recovering BPA is disadvantageous in that inordinately large quantities of acid are required to effect the neutralization, not to mention an extraordinarily long time for the precipitation to reach completion, thereby requiring extremely large vessels to provide the necessary residence time. For example, in the before-mentioned plant producing about 60 million pounds per year of polycarbonate resin, an average of about 45,097 pounds per hour of aqueous alkaline phase is generated and sufficient acid would be required to neutralize about 180 pounds, 443 pounds and 135 pounds per hour, respectively of caustic, sodium carbonate and sodium bisphenate. Moreover, as the precipitated BPA must be filtered and washed prior to re-use, additional costs are incurred both in this extra processing step and in the provision of the requisite apparatus.

OBJECTS OF THE INVENTION

It is, therefore, an object of this invention to provide a means of recovering unreacted BPA from the aqueous alkaline phase generated in the production of polycarbonates. It is another object of this invention to provide a means of continuously recovering said BPA and returning the recovered BPA to the main reaction stream. A further object of this invention is to reduce the level of organic materials in the aqueous alkaline phase generated in the production of polycarbonates by recovering, in a usable form, a substantial portion of the unreacted BPA contained therein. An additional object of this invention is to provide a more efficient, more economical means of recovering unreacted BPA from the aqueous alkaline phase generated in the production of polycarbonate resin devoid of the disadvantages of the prior art.

BRIEF DESCRIPTION OF THE INVENTION

Generally speaking, the invention comprises phosgenating the aqueous alkaline layer generated in the production of polycarbonate resin, the phosgene reacting with the unreacted BPA contained in the aqueous alkaline layer to produce a low molecular weight polymer having a high level of chlorocarbonate end groups and returning a solvent solution of the low molecular weight polymer to the main reaction stream.

DETAILED DESCRIPTION OF THE INVENTION

Figure 1:
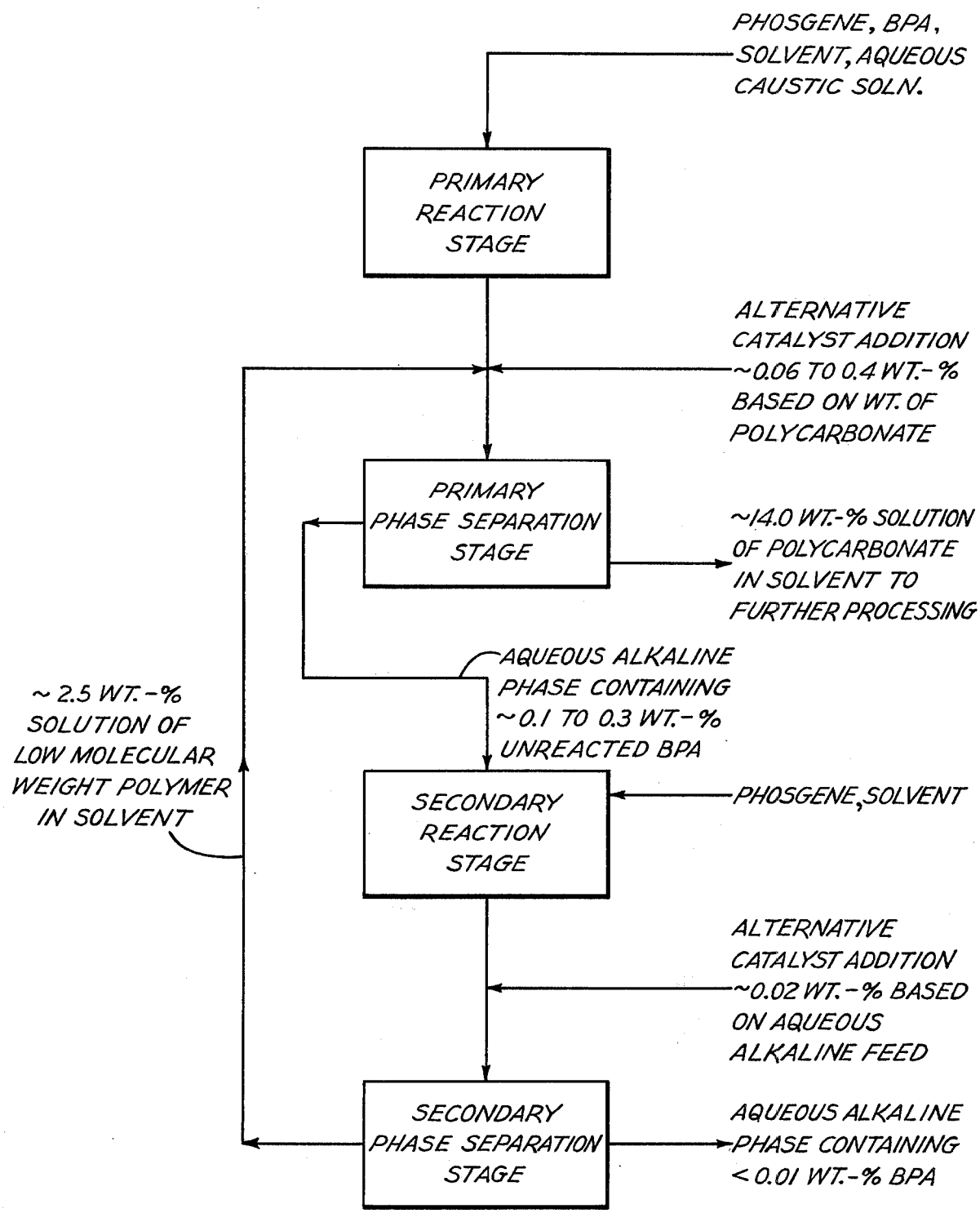
FIG. 1 is a flow sheet which depicts generally a typical polycarbonate production process embodying the invention.

Polycarbonate starting materials are reacted in a primary reaction stage, the relative proportions of materials being selected in a manner well known to the art and described, for example, in U.S. Pat. Nos. 3,043,800; 3,046,255; 3,213,059; 3,173,891; 3,240,755 and 3,530,094. After polymer formation, the reaction mixture is separated into two immiscible phases in a phase separation stage by means of a decanter or the like. The organic solvent phase containing the dissolved polycarbonate resin is drawn-off for further processing to recover and refine the finished resin. The aqueous alkaline phase containing unreacted BPA is conveyed to a secondary reaction stage to which is fed phosgene and solvent. Preferably the phosgene is dissolved in the solvent feed to the secondary reaction stage. The phosgene reacts with the unreacted BPA in the aqueous alkaline phase, the reaction occurring at the interface of the solvent/aqueous phases, to form a low molecular weight polymer having a high level of chlorocarbonate end groups due to the low level of BPA in the aqueous alkaline phase. The low molecular weight polymer is dissolved in the solvent and the solvent solution is separated in a phase separation stage and returned to the main reaction stream wherein an excess of BPA is present to completely react the chlorocarbonate end groups on the low molecular weight polymer.

As before-mentioned, it is advantageous to catalyze the BPA/phosgene reaction, the catalyst being preferably added to the reaction mixture after the initial reaction in the primary reaction stage and prior to the introduction of the reaction mixture into the primary phase separation stage. Alternatively, the catalyst may be added between the secondary reaction stage and the secondary phase separation stage, the catalyst then being introduced into the main reaction stream along with the solvent solution of the low molecular weight polymer formed in the secondary reaction stage and recycled to the main stream. The addition of the catalyst between the secondary reaction stage and the secondary phase separation stage also enhances the reaction between the phosgene and unreacted, excess BPA in the aqueous alkaline layer resulting in increased removal of the unreacted BPA for a given set of reaction conditions. According to this latter embodiment of catalyst addition, the amount of catalyst is based on the quantity of aqueous alkaline layer fed to the secondary reaction stage, about 0.02 percent by weight of catalyst being added based on the feed rate of aqueous alkaline layer. For example, assuming that 100 lb/hour of aqueous alkaline layer containing 0.25 percent by weight BPA is fed to the secondary reaction stage, 0.02 lb/hr. of, for example, triethylamine catalyst would be used, resulting in a molar ratio of catalyst to BPA of about 0.22 to 1. It is surprising that the low molecular weight polymer would be formed in the presence of such a relatively large amount of catalyst since it is well known that using excessive amounts of catalyst could hinder rather than promote a chemical reaction.

It has been found that the BPA content in the alkaline aqueous layer may be reduced to less than 0.01 percent by weight, in which case a molar ratio of at least about 2.5 mols of phosgene per mol of BPA has proved to be optimum. In addition, it has been found that sufficient solvent be used to produce less than 5.0 percent and preferably about a 2.5 percent by weight solution of low molecular weight polymer in the solvent. If less solvent is used, for example, only sufficient solvent to produce about a 5.0 percent by weight polymer solution, BPA recovery is retarded. It is, of course, to be realized that the extent of BPA recovery is also a function of residence time in the secondary reaction stage, the more time allowed for reaction, the more BPA is converted to the low molecular weight polymer. In a continuous system, the residence time in the reactor should not, as a practical manner, exceed about 5 or 6 minutes and preferably not more than about 2 minutes.

The invention is further illustrated but is not intended to be limited by the following examples in which all parts and percentages are by weight unless otherwise indicated.

EXAMPLE 1

Preparation of Polycarbonate

A polycarbonate resin is prepared in a conventional manner by reacting in a primary reaction stage about 1.1 to about 1.2 mols of phosgene per mol of BPA in a heterogeneous liquid medium comprising an aqueous caustic solution and a mixed organic solvent. The aqueous caustic solution contains about 40 to 60 percent by weight sodiumhydroxide and is used in such quantity so that about 1 mol of NaOH is present for each mol of phosgene. Sufficient mixed solvent is used so as to produce an about 14 percent by weight solution of polycarbonate in the mixed solvent. The residence time in the primary reaction stage is about 2 to 5 minutes after which the reaction mixture is charged to a primary separation stage. About 0.2 percent by weight of triethylamine catalyst based on the weight of polycarbonate is added to the reaction mixture subsequent to discharge of the mixture from the primary reaction stage and prior to the mixture entering the primary separation stage. In the primary separation stage, the reaction mixture is separated by quiescent settling into two immiscible phases, the residence time in the primary separation stage being about 2 minutes. The organic solvent phase containing the dissolved polycarbonate resin and catalyst is drawn off for further processing and the aqueous alkaline phase is treated in accordance with the invention to remove excess, unreacted BPA.

EXAMPLE 2

BPA Recovery from the Aqueous Alkaline Phase According to the Invention

A typical aqueous alkaline phase generated in the production of a polycarbonate resin according to Example 1 has the following analysis:

| pH    |            | 12.5 |
|-------|------------|------|
| BPA,  | Wt-percent | 0.28 |
| OH$^-$, | "        | 0.35 |
| CO$_3^=$, | "      | 0.36 |
| Cl$^-$, | "        | 5.67 |
| NaCl, | "          | 9.35 |

The aqueous alkaline phase is fed to the secondary reaction stage at a rate of about 744 lbs/hr, which corresponds to about 0.0091 lb-mols/hr of BPA. Concurrently, about 0.02275 lbs-mols/hr of phosgene dissolved in a mixed solvent is fed to the secondary reaction stage, sufficient mixed solvent being used such that the low molecular weight polymer resulting from the reaction of phosgene and BPA will form about a 2.5 percent by weight solvent solution. The molar ratio of phosgene to BPA is about 2.5 to 1 and the residence time in the secondary reaction stage is about 2 minutes.

The reaction mixture is then fed to the secondary separation stage to effect phase separation, the residence time in the secondary phase separation stage being about 2 minutes. The solvent phase containing the dissolved low molecular weight polymer is returned to the main reaction stream and the aqueous alkaline phase is discharged to waste.

The aqueous alkaline phase after BPA recovery, according to the foregoing, analyzed as follows:

| pH    |            | 12.2  |
|-------|------------|-------|
| BPA,  | Wt-percent | 0.009 |
| OH$^-$, | "        | 0.10  |
| CO$_3^=$, | "      | 0.52  |
| Cl$^-$, | "        | 5.62  |
| NaCl, | "          | 9.29  |

A sample of the solution of low molecular polymer in the solvent was collected, washed and a polymer film was cast and dried in a conventional manner. The relative viscosity of the dried polymer was determined and an end group analysis was performed with the following results:

| Relative viscosity | 1.045 |      |
|--------------------|-------|------|
| —OH end groups     | 0.09  | Wt % |
| —COCl end groups   | 4.54  | Wt % |

It is readily seen from an inspection of these data that the polymer produced has a low molecular weight and contains a high level of chlorocarbonate end groups, therefore, it is readily reacted in the main reaction stream as the excess of BPA in the main stream will completely react the chlorocarbonate end groups.

EXAMPLE 3

Effect of Solvent on BPA Recovery from the Aqueous Alkaline Phase

As before mentioned, it has been found that if too little solvent is used in the secondary reaction stage, it will retard the formation of the low molecular weight polymer and less BPA will be recovered from the aqueous alkaline layer at a given molar ratio of phosgene to BPA and at a given reaction time. To illustrate this effect of solvent on BPA recovery, an aqueous alkaline layer containing about 0.3 percent by weight BPA was phosgenated using molar ratios of phosgene to BPA of 2 to 1 and 2.5 to 1, and sufficient mixed solvent was used to form 5 percent by weight and 2.5 percent by weight solutions of low molecular weight polymer in the solvent. After treatment, the percent BPA remaining in the aqueous alkaline layer was as follows:

| | Wt % BPA Remaining In Aqueous Alkaline Layer | |
|---|---|---|
| Molar Ratio phosgene/BPA | 5% Solvent Solution of Low M.W. polymer | 2.5% Solvent Solution of low M.W. polymer |
| 2.0 | 0.05 | 0.025 |
| 2.5 | 0.01 | 0.007 |

As the data clearly indicate, the quantity of solvent used in the secondary reaction stage is a factor in optimizing the extent of recovery of BPA from the aqueous alkaline layer and sufficient solvent should be used to provide a solution of low molecular weight polymer of less than 5 percent by weight and preferably about 2.5 percent by weight.

EXAMPLE 4

Effect of Catalyst on BPA Recovery from the Aqueous Alkaline Layer

As described hereinabove, a catalyst can be added either between the primary reaction stage and the primary separation stage or between the secondary reaction stage and the secondary separation stage. In the former case, between about 0.06 and 0.40 percent by weight of catalyst is used based on the weight of polycarbonate resin and in the latter case, about 0.02 percent by weight of catalyst is used based on the weight of aqueous alkaline layer, and the catalyst enters the main reaction stream along with the solvent solution of the low molecular weight polymer. It has been found to be advantageous to add the catalyst between the secondary reaction stage and the secondary separation stage as the presence of catalyst enhances the recovery of BPA from the aqueous alkaline layer. As sufficient catalyst must be added at this point to catalyze the main polycarbonate reaction, the catalyst to BPA molar ratio is quite high and it is surprising that BPA recovery is enhanced as it is known that an excessive amount of catalyst could inhibit rather than accelerate a chemical reaction.

To illustrate the effect of catalyst addition in the BPA recovery stage, the following data was generated.

About 744 lb/hr of alkaline layer containing about 0.17 percent (0.00555 lb-mols/hr) BPA was fed to the secondary reaction stage, concurrently with phosgene dissolved in the said mixed solvent. An amount of phosgene was used to maintain a phosgene/BPA molar ratio of about 2.5 and sufficient mixed solvent was used to result in a 2.5 percent by weight solution of low molecular weight polymer in solvent. In one instance, triethylamine catalyst was added between the primary reaction stage and the primary separation stage, with the result that no catalyst is present in the aqueous alkaline layer fed to the secondary reaction stage as the catalyst dissolves in the solvent solution in the main polycarbonate reaction stream. In the second instance, the triethylamine catalyst was added between the secondary reaction stage and the primary reaction stage. After separation of the solution of low molecular weight polymer in the solvent, the BPA content of the aqueous alkaline layers analyzed as follows:

| TEA/BPA Molar Ratio | wt-% BPA remaining in aqueous alkaline layer |
|---|---|
| — | .010 |
| 0.265 | .008 |

In like manner, about 74.4 lb/hr of aqueous alkaline layer having a BPA content of 0.3 percent by weight (0.000979 lb-mol/hr) was fed to the secondary reaction stage and treated as described above, with the following results:

| TEA/BPA Molar Ratio | wt-% BPA remaining in aqueous alkaline layer |
|---|---|
| — | 0.0074 |
| 0.151 | 0.0021 |

The data clearly indicate that BPA removal from the aqueous alkaline layer is enhanced notwithstanding the relatively high molar ratio of catalyst to BPA in the BPA recovery stage.

EXAMPLE 5

Effect of Phosgene/BPA Molar Ratio on BPA Recovery from the Aqueous Alkaline Layer As before mentioned, it has been found that the optimum molar ratio of phosgene to BPA in the aqueous alkaline layer is about 2.5 to 1. A low phosgene/BPA ratio results in less efficient BPA removal while BPA removal is not significantly improved at phosgene/BPA molar ratios much in excess of 2.5 to 1. Moreover, the use of excessive amounts of phosgene are to be avoided as the same increases the acidity of the aqueous alkaline layer and could cause problems in the waste treatment facility in which the aqueous alkaline layer is treated subsequent to BPA removal and prior to discharge from the plant.

To illustrate the effects of phosgene/BPA molar ratios on BPA recovery from the aqueous alkaline layer, an aqueous alkaline layer having a BPA content of about 0.3 percent by weight was treated with varying amounts of phosgene with the following results:

| $COCl_2$/BPA Molar Ratio | Wt-% BPA remaining in aqueous alkaline layer |
|---|---|
| 1.20 | .09 |
| 2.00 | .05 |
| 2.50 | .009 |
| 2.64 | .009 |
| 2.93 | .007 |

Figure 2:
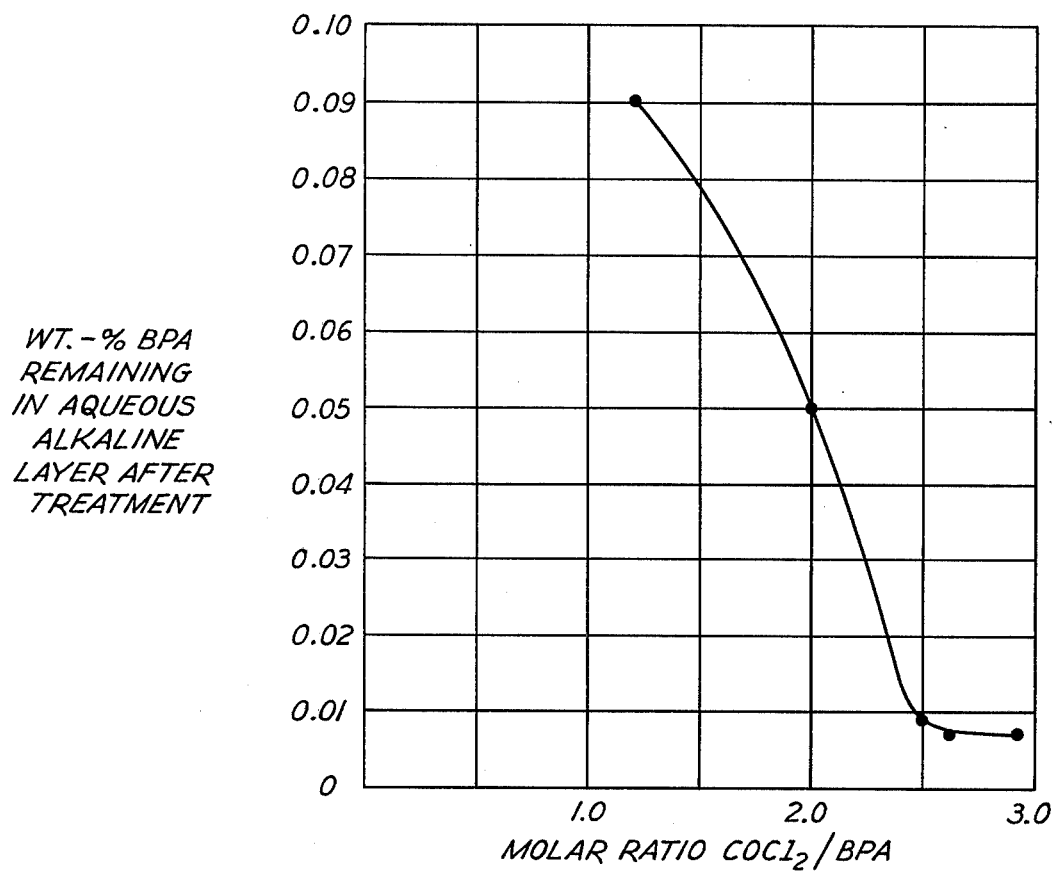
FIG. 2 is a graph showing the effect of phosgene/BPA molar ratio on BPA recovery from the aqueous alkaline phase.

In each case, the phosgene was introduced into the secondary reaction stage dissolved in the said mixed solvent, sufficient solvent being used to produce a 2.5 percent by weight solution of low molecular weight polymer in the solvent. The above data are graphically depicted in FIG. 2 wherein the effect of the phosgene/BPA molar ratio is clearly shown.

In summary, as the foregoing examples illustrate, the invention provides a relatively simple and straight-forward means of removing excess, unreacted BPA from the aqueous alkaline phase generated in the production of polycarbonates. The examples further illustrate that the extent of BPA removal is enhanced by a number of factors, notably the amount of solvent fed to the secondary reaction stage, the addition of a catalyst in the BPA removal stage and the molar ratio of phosgene of BPA in the aqueous alkaline phase.

Although the invention in its preferred embodiments has been described in considerable detail in the foregoing, it is to be understood that many variations would be apparent to and could be made therein by those skilled in the art without departing from the spirit and scope thereof.

What is claimed is:

1. A process for utilizing unreacted bisphenol-A in the aqueous alkaline phase generated in the production of polycarbonate resins in a main reaction stream comprising contacting said aqueous alkaline phase with phosgene in a secondary reaction stream in the presence of an organic solvent whereby a low molecular weight polymer having chlorocarbonate end groups is formed in the solvent via the reaction between the phosgene and the bisphenol-A and separating the solvent solution of the low molecular weight polymer from the aqueous alkaline phase.

2. The process of claim 1 including the further step of returning the solvent solution of the low molecular weight polymer to the main polycarbonate reaction stream, wherein the chlorocarbonate end groups on the polymer are reacted with additional bisphenol-A.

3. The process of claim 1 wherein the molar ratio of phosgene to bisphenol-A in the aqueous alkaline phase is at least about 2.5 to 1.

4. The process of claim 1 wherein sufficient solvent is used in the secondary reaction stream so as to form less than 5.0 percent by weight solution of low molecular weight polymer in the solvent.

5. The process of claim 4 wherein sufficient solvent is used in the secondary reaction stream so as to form about a 2.5 percent by weight solution of low molecular weight polymer in the solvent.

6. The process of claim 1 wherein the phosgene is introduced in the secondary reaction stream in solution with the solvent.

7. The process of claim 1 wherein a catalyst is added to the main reaction stream.

8. The process of claim 7 wherein the catalyst is triethylamine and is added in an amount of about 0.06 to 0.4 percent by weight based on the weight of polycarbonate.

9. The process of claim 1 wherein a catalyst is added to the secondary reaction stream.

10. The process of claim 9 wherein the catalyst is triethylamine and is added in an amount of about 0.02 percent by weight based on the weight of aqueous alkaline phase.

11. In a process for producing polycarbonate resin comprising reacting in a main reaction stream phosgene with bisphenol-A in a heterogeneous liquid reaction medium comprising an aqueous alkaline solution and an inert organic solvent, the solvent retaining the polycarbonate resin in solution therein and separating the solvent solution phase containing the dissolved polymer from the aqueous alkaline phase that contains unreacted bisphenol-A, the improvement comprising the steps of contacting the aqueous alkaline phase with phosgene in a secondary reaction stream in the presence of an organic solvent to form a solvent solution of a low molecular weight polymer having chlorocarbonate end groups, separating the said solvent solution from the aqueous alkaline phase and returning the solvent solution of the low molecular weight polymer to the main reaction stream.

12. The improvement of claim 11 wherein sufficient phosgene is used to maintain a molar ratio of phosgene to bisphenol-A in the aqueous alkaline phase of at least about 2.5 to 1.

13. The improvement of claim 11 wherein sufficient solvent is used in the secondary reaction stream to form less than a 5 percent by weight solution of the low molecular weight polymer in the solvent.

14. The improvement of claim 13 wherein the solvent solution contains about 2.5 percent by weight of low molecular weight polymer.

15. The improvement of claim 11 wherein the phosgene is introduced in the secondary reaction stream in solution with said solvent.

16. The improvement of claim 11 wherein a catalyst is added to the main reaction stream.

17. The improvement of claim 16 wherein the catalyst is triethylamine and is added in an amount of about 0.06 to 0.4 percent by weight based on the weight of polycarbonate.

* * * * *